C. M. WILD.
ELECTRIC METER.
APPLICATION FILED DEC. 12, 1914.

1,188,593.

Patented June 27, 1916.

WITNESSES:

INVENTOR
Charles M. Wild
BY
ATTORNEYS

UNITED STATES PATENT OFFICE.

CHARLES M. WILD, OF SPRINGFIELD, MASSACHUSETTS, ASSIGNOR TO BOSCH MAGNETO COMPANY, OF NEW YORK, N. Y., A CORPORATION OF NEW YORK.

ELECTRIC METER.

1,188,593.  Specification of Letters Patent.  Patented June 27, 1916.

Application filed December 12, 1914. Serial No. 876,833.

*To all whom it may concern:*

Be it known that I, CHARLES M. WILD, a subject of the Emperor of Germany, residing at No. 14 Springfield street, Springfield, county of Hampden, and State of Massachusetts, have invented certain new and useful Improvements in Electric Meters; and I do hereby declare the following to be a full, clear, and exact description of the invention, such as will enable others skilled in the art to which it appertains to make and use the same.

In ammeters for direct current electric circuits, it is customary to provide a current shunt for the deflecting coil and this shunt carries substantially all the current to be measured. In case of a large current flow due, for instance, to a short circuit on the system, the shunt may be fused or otherwise damaged and the deflecting coil also will be burned out or damaged. These occurrences are particularly likely on automobiles or motor boats on account of the vibration and shock to which the equipment is continually subjected.

One object of the present invention is to safeguard the meter against action of abnormally large currents, and I obtain this object by providing a switch which normally short circuits the current shunt and thereby carries substantially all the current except when the operator opens the switch to obtain current readings.

Furthermore, it is customary to provide a combined ammeter and voltmeter for the electric circuits on automobiles and motor boats, and a switch for changing over the meter to indicate one or the other quantity as desired. This is accomplished by connections such that in one position of the switch, the deflecting coil is connected across the terminals of the current shunt, the meter then indicating the current strength; and such that, in the other position of the switch, one terminal of the deflecting coil is disconnected from the current shunt and connected to a resistance coil, which is connected to the other side of the circuit, the meter then indicating the voltage of the system.

In accordance with my invention, the mechanism which operates the switch to change over the meter, also operates the switch which short circuits the current shunt, and preferably the switch-operating mechanism is normally held by a spring in that position wherein the current shunt is protected by the short circuiting switch and wherein the deflecting coil is connected to the resistance coil to indicate voltage.

Figure 1:
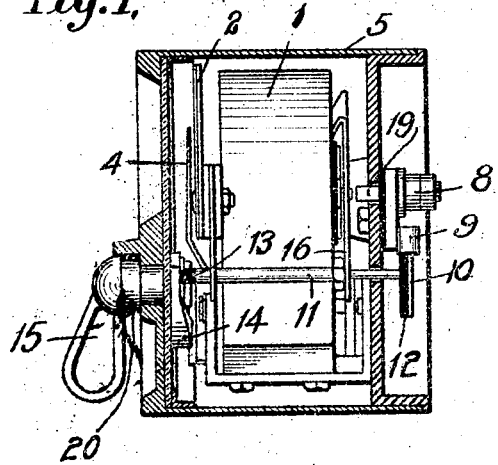
Figure 2:
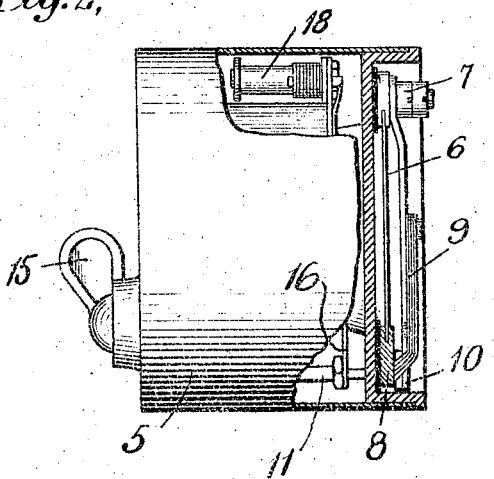
Figure 3:
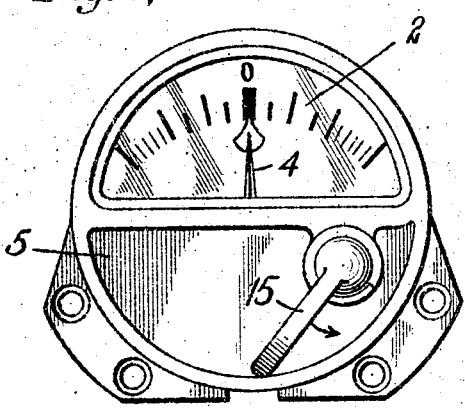
Figure 4:
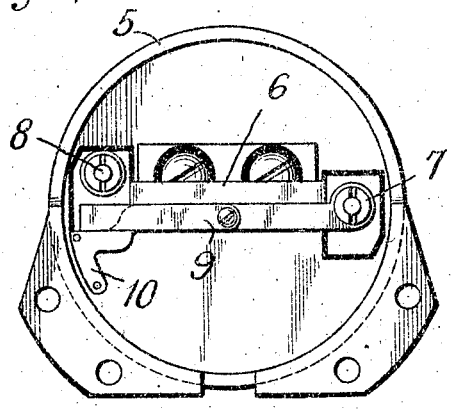
Figure 5:
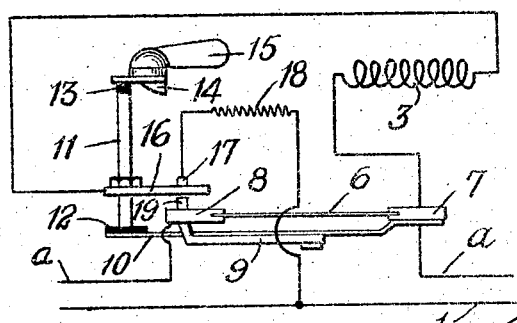

In the accompanying drawings illustrating my invention, Figure 1 is a side elevation, partly in section, with the casing of the meter removed to particularly show the switch operating mechanism; Fig. 2 is a similar view particularly showing the current shunt and the short circuiting switch therefor; Fig. 3 is a front view of the meter; Fig. 4 is a rear view of the meter; and Fig. 5 is a diagram of connections.

The meter comprises a permanent magnet 1 of the horse shoe type, a central zero scale 2, and a deflecting coil 3 with the pointer 4, all inclosed in the casing 5 and constructed in the well known way. The current shunt 6 is mounted on the back of the casing and has two terminals 7 and 8 for connection in one side $a$ of the circuit. The switch 9 is fastened to the terminal 7 and is composed of spring metal tending to engage the terminal 8. The switch has a projecting end 10 with which coöperates a push rod 11, insulated at 12 from the switch and at 13 from the cam 14. The handle 15 carrying the cam is arranged on the front of the casing and is held by the spring 20 in that position shown in the drawings wherein the switch 9 is closed to short circuit the current shunt 6.

One terminal of the deflecting coil 3 is connected by an insulated wire to the terminal 7 of the current shunt and the other terminal of the deflecting coil is permanently connected to the switch tongue 16 of spring metal which tends to engage the contact 17 connected to one terminal of the resistance coil 18. The other terminal of this coil is connected to the other side $b$ of the circuit, or is grounded on the casing of the meter in case the meter is to be used in a grounded system. Thus, when the parts have the position illustrated, the meter indicates the voltage of the circuit; the connections being from the side $a$ of the circuit through terminal 7, deflecting coil 3, switch tongue 16, contact 17 and resistance coil 18 to the other side $b$ of the circuit.

When it is desired to indicate the current in the circuit, the handle 15 is turned about 90° in the direction of the arrow in Fig. 3, whereupon the rising part of the cam 14 depresses the push rod 11, opening the short circuiting switch 9 and pressing the switch tongue 16 into engagement with the contact 19 on the terminal 8. The deflecting coil is then connected directly across the terminals of the current shunt 6, through which substantially all of the current then flows. When the handle 15 is released, the spring 20 returns it to that position wherein the meter indicates the voltage of the system and wherein the current shunt is short circuited and thereby protected by the switch 9.

Having thus described my invention, what I claim is:

1. In an electric meter, a deflecting coil carrying an indicator, a current shunt for said coil, and a switch mounted directly on the current shunt, one end of said switch being fastened to one terminal of the current shunt, and the other end of the switch being engageable with the other terminal of the current shunt.

2. In an electric meter, a deflecting coil carrying an indicator, a current shunt for said coil, a switch mounted directly on the current shunt and embodying a spring blade fastened at one end to one terminal of the current shunt so that its other end tends constantly to engage the other terminal of the current shunt, and operating mechanism for holding the free end of the spring blade out of engagement with the terminal of the current shunt.

3. In an electric meter, a deflecting coil carrying an indicator, circuit connections including a current shunt for said coil adapting the meter for indications of current strength, a switch normally short circuiting the current shunt, circuit connections including a resistance adapting the meter for indications of voltage, and a single operating lever normally spring-pressed to a position in which the switch short circuits the current shunt and the circuit connections including the resistance adapt the meter for indications of voltage, said lever having a single other operative position in which position the switch is held out of short circuiting position and the circuit connections including the current shunt adapt the meter for indications of current strength.

4. In an electric meter, a deflecting coil carrying an indicator, a resistance coil, a current shunt, designed to be shunted by the deflecting coil, a switch adapted to disconnect one terminal of the deflecting coil from the current shunt and to connect it to the resistance coil, a short circuiting switch designed to short circuit the current shunt, and switch operating mechanism which in one position operates the first mentioned switch to connect the deflecting coil to the resistance coil to obtain an indication of voltage, and which in a second position connects the deflecting coil across the current shunt and opens the short circuiting switch to obtain an indication of current strength.

5. In an electric meter, a deflecting coil carrying an indicator, circuit connections including a resistance for adapting the meter to indicate voltage, and other circuit connections including a current shunt to adapt the meter to indicate current strength, a short circuiting switch for the current shunt, operating mechanism operative with said circuits to change over the meter from one to another of said indications, and a spring tending to hold the operating mechanism in that position in which the meter indicates voltage and in which the current shunt is short circuited by the switch.

In testimony whereof I affix my signature in presence of two witnesses.

CHARLES M. WILD.

Witnesses:
 ALMA SCHWAB,
 ROLF LINDENHAYN.